(12) United States Patent
Higashi (10) Patent No.: US 10,831,055 B2
(45) Date of Patent: Nov. 10, 2020

(54) LIQUID CRYSTAL DISPLAY APPARATUS

(71) Applicant: Mitsubishi Electric Corporation, Tokyo (JP)

(72) Inventor: Takuya Higashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 16/233,797

(22) Filed: Dec. 27, 2018

(65) Prior Publication Data

US 2019/0227394 A1 Jul. 25, 2019

(30) Foreign Application Priority Data

Jan. 24, 2018 (JP) .................................. 2018-009331

(51) Int. Cl.
*G02F 1/1335* (2006.01)
*G02F 1/1343* (2006.01)
(Continued)

(52) U.S. Cl.
CPC .. *G02F 1/133512* (2013.01); *G02F 1/134363* (2013.01); *G02F 1/136209* (2013.01); *G02F 1/136286* (2013.01); *G02F 1/1368* (2013.01); *G02F 1/133514* (2013.01); *G02F 2001/134318* (2013.01); *G02F 2001/134345* (2013.01); *G02F 2001/134372* (2013.01); *G02F 2201/121* (2013.01); *G02F 2201/122* (2013.01); *G02F 2201/123* (2013.01); *G02F 2201/40* (2013.01)

(58) Field of Classification Search
CPC ......... G02F 1/133512; G02F 1/136209; G02F 1/134363; G02F 2001/134372; G02F 2201/40; G02F 2001/134318
See application file for complete search history.

(56) References Cited

U.S. PATENT DOCUMENTS 6,259,200 B1 * 7/2001 Morita .............. G02F 1/136286
313/498
7,554,630 B2 * 6/2009 Kwon ............... G02F 1/136209
349/111
(Continued)

FOREIGN PATENT DOCUMENTS

CN 104749817 B * 1/2018
JP 2005-196162 A 7/2005
(Continued)

*Primary Examiner* — Jia X Pan
(74) *Attorney, Agent, or Firm* — Studebaker & Brackett PC (57) ABSTRACT

One of pixel electrodes and a common electrode of the liquid crystal display apparatus is a first electrode, and the other one of the pixel electrodes and the common electrode is a second electrode which is disposed between the first electrode and a liquid crystal layer. The second electrode includes linear portions which are formed on each subpixel. Each linear portion includes a bent portion which changes an extension direction of the linear portion. A light shielding layer overlaps a gate wire, a source wire and the bent portion formed on a first subpixel included in a plurality of subpixels in a plan view, and makes an aperture ratio of the first subpixel lower than an aperture ratio of a second subpixel included in a plurality of subpixels and belonging to a pixel identical to a pixel to which the first subpixel belongs.

10 Claims, 6 Drawing Sheets

(51) Int. Cl.
*G02F 1/1362* (2006.01)
*G02F 1/1368* (2006.01)

(56) References Cited

U.S. PATENT DOCUMENTS

| | | | |
|---|---|---|---|
| 2005/0140899 A1 | 6/2005 | Ko | |
| 2009/0225267 A1* | 9/2009 | Atarashiya | G02F 1/133512 349/139 |
| 2009/0296037 A1* | 12/2009 | Tanaka | G02F 1/134363 349/143 |
| 2010/0157228 A1* | 6/2010 | Sakurai | G02F 1/1337 349/141 |
| 2012/0194776 A1 | 8/2012 | Tanaka et al. | |
| 2013/0235289 A1* | 9/2013 | Yamaguchi | G02F 1/13306 349/33 |
| 2014/0160401 A1* | 6/2014 | Yonemura | G02F 1/134309 349/96 |
| 2017/0146869 A1* | 5/2017 | Hirosawa | G02F 1/133512 |
| 2018/0047326 A1* | 2/2018 | Tsuchida | G09G 3/2074 |
| 2018/0356692 A1* | 12/2018 | Okumoto | G02F 1/134309 |

FOREIGN PATENT DOCUMENTS

| | | |
|---|---|---|
| JP | 2010-009004 A | 1/2010 |
| JP | 2010-139918 A | 6/2010 |
| JP | 5207946 B2 * | 6/2013 |

\* cited by examiner

LIQUID CRYSTAL DISPLAY APPARATUS

BACKGROUND OF THE INVENTION

Field of the Invention

The present invention relates to a liquid crystal display apparatus which includes a horizontal electric field type liquid crystal panel.

Description of the Background Art a Features of Liquid Crystal Panel

A liquid crystal panel provided to a liquid crystal display apparatus has features of the light weight, the thin thickness and low power consumption compared to a cathode ray tube (CRT). Hence, the liquid crystal panel is used to display information in many electronic devices.

b Image Display of Liquid Crystal Display Apparatus

A liquid crystal display apparatus includes a plurality of pixels. A liquid crystal panel includes a liquid crystal layer including multiple liquid crystal molecules aligned in a state where the liquid crystal molecules are oriented in a predetermined direction. When the liquid crystal display apparatus displays an image, an orientation direction of the liquid crystal molecules included in the liquid crystal layer is changed by an applied electric field, and a light transmission amount of the liquid crystal panel is changed by the applied electric field in each pixel of a plurality of pixels. Thus, the liquid crystal display apparatus displays an image corresponding to the electric field applied to a plurality of pixels.

c Reflective Type, Transmission Type, and Semi-Transmission Type

Liquid crystal display apparatus are roughly classified into a reflective type, a transmission type and a semi-transmission type.

In a reflective type liquid crystal display apparatus, external light arriving from an outside enters a liquid crystal layer, transmits through the liquid crystal layer after entering the liquid crystal layer, is reflected by a reflector after transmitting through the liquid crystal layer, transmits through the liquid crystal layer again after being reflected by the reflector, and is emitted from the liquid crystal layer after transmitting through the liquid crystal layer again.

In a transmission type liquid crystal display apparatus, backlight emitted from a backlight apparatus enters a liquid crystal layer, transmits through the liquid crystal layer after entering the liquid crystal layer, and is emitted from the liquid crystal layer after transmitting through the liquid crystal layer.

A semi-transmission type liquid crystal display apparatus has features of both of the reflective type liquid crystal display apparatus and the transmission type liquid crystal display apparatus.

d Chromaticity Adjustment of Color Display Type Liquid Crystal Display Apparatus Liquid crystal display apparatuses are roughly classified into a monochrome display type and a color display type.

Each pixel provided to the color display type liquid crystal display apparatus includes, for example, R, G and B subpixels which respectively include color filters of red (R), green (G) and blue (B) which are three primary colors of light. The color of each pixel is determined based on a mixing amount of light transmitting through each of the R, G and B subpixels, and is determined based on a color mixing amount of a color of each of the R, G and B subpixels. When, for example, 256 types of voltages associated with 256 tone values from 0 to 255 expressed by a bit sequence of 8 bits is applied to each subpixel of the R, G and B subpixels, each subpixel can be lighted up at 256 types of brightnesses, and it is possible to cause each pixel to display $256^3$ types of colors by changing a combination of brightnesses of the R, G and B subpixels. Furthermore, by lighting up all R, G and B subpixels, it is possible to cause each pixel to display white (W).

In the color display type liquid crystal display apparatus, chromaticity adjustment of each color of R, G and B is performed for adjusting the color displayed by each subpixel to a desired chromaticity by adjusting the color according to a type of a coloring material which makes the color filter provided to each subpixel, and the film thickness of the color filter provided to each subpixel. However, as described above, the color display type liquid crystal display apparatus displays W on each pixel by lighting up all R, G and B subpixels. Therefore, the chromaticity of W displayed by each pixel is uniquely determined according to the chromaticity of R, G and B respectively displayed by the R, G and B subpixels. Hence, when the above chromaticity adjustment of each color of R, G and B is performed, the chromaticity of W displayed by each pixel does not become a desired chromaticity in some cases. Hence, chromaticity adjustment of W for adjusting the chromaticity of W displayed by each pixel to the desired chromaticity is performed by a simple structure by performing brightness balance adjustment of adjusting a ratio of aperture ratios of R, G and B subpixels by a light shielding layer, and adjusting a contribution ratio of chromaticities of R, G and B respectively displayed by the R, G and B subpixels to the chromaticity of W displayed by each pixel. For example, the brightness balance adjustment is performed to decrease the aperture ratio of at least one subpixel included in the R, G and B subpixels by the light shielding layer, and decrease the contribution ratio of the chromaticity of a color displayed by this at least one subpixel to the chromaticity of W displayed by each pixel.

e Vertical Electric Field Type and Horizontal Electric Field Type

Types which apply an electric field to a liquid crystal layer of a liquid crystal panel are roughly classified into a vertical electric field type and a horizontal electric field type.

In the vertical electric field type liquid crystal panel, one pair of electrodes are disposed sandwiching a liquid crystal layer, and an electric field in a substantially vertical direction is applied to liquid crystal molecules included in the liquid crystal layer. A twisted nematic (TN) mode, a vertical alignment (VA) mode, a multi-domain vertical alignment (MVA) mode and so on are known as driving modes of vertical electric field type liquid crystal panels.

In a horizontal electric field type liquid crystal panel, one pair of substrates are disposed sandwiching a liquid crystal layer, one pair of electrodes are disposed on an inner main surface of one substrate of one pair of substrates and are insulated from each other, and an electric field in a substantially horizontal direction is applied to liquid crystal molecules included in the liquid crystal layer. The horizontal electric field type liquid crystal panel has a feature that it is possible to obtain a wide viewing angle. An in-plane switching (IPS (registered trademark)) mode, a fringe field switching (FFS) mode and so on are known as driving modes of horizontal electric field type liquid crystal panels. In the IPS mode, one electrode and the other electrode of one pair of electrodes are comb electrodes, and one electrode does not overlap the other electrode in a plan view. In the FFS mode, one electrode of a pair of electrodes is a planar electrode, and the other electrode of a pair of electrodes is an electrode including slit-like openings. The one electrode overlaps the other electrode in the plan view, and the one electrode is insulated from the other electrode by an insulation layer.

f Multi-Domain Structure

In recent years, to further enhance the feature that a wide viewing angle can be obtained, horizontal electric field type liquid crystal display apparatuses increasingly adopt a multi-domain structure that each subpixel is divided into a plurality of domains respectively including a plurality of different electric field application directions by devising an electrode structure. A technique disclosed in Japanese Patent Application Laid-Open No. 2010-009004 is one example.

A horizontal electric field type liquid crystal panel which adopts the multi-domain structure includes a non-light shielding portion in which a light shielding layer is not disposed and which allows transmission of external light or backlight. The non-light shielding portion includes a pixel bent portion which is a boundary between two neighboring domains, and a remaining portion which is other than the pixel bent portion.

When an electric field is not applied to the liquid crystal layer, a light transmittance of the pixel bent portion is the same as a light transmittance of the remaining portion.

However, when the electric field is applied to the liquid crystal layer, the light transmittance of the pixel bent portion is smaller than the light transmittance of the remaining portion. This is because, when the electric field is applied to the liquid crystal layer, a region in which an orientation direction of liquid crystal molecules is disturbed, and the light transmittance of the liquid crystal layer lowers is produced in the pixel bent portion.

Hence, focusing on a contrast value which is a ratio of the light transmittance of the liquid crystal layer in a case where the electric field is not applied to the liquid crystal layer and the light transmittance of the liquid crystal layer in a case where the electric field is applied to the liquid crystal layer, the contrast value of the pixel bent portion is lower than the contrast value of the remaining portion.

Furthermore, when the above chromaticity adjustment of W is performed, and the aperture ratio of a certain subpixel is decreased, a ratio of an area occupied by the pixel bent portion having a low contrast value with respect to an area occupied by the non-light shielding portion becomes high, and an effective contrast value and display quality of the liquid crystal display apparatus lower.

SUMMARY

An object of the present invention is to provide a liquid crystal display apparatus which, even when a multi-domain structure is adopted and chromaticity adjustment of W is performed, can prevent a decrease in an effective contrast value and display quality caused by formation of low contrast regions.

The present invention relates to a liquid crystal display apparatus.

The liquid crystal display apparatus includes an array substrate, a liquid crystal layer and a color filter substrate. The color filter substrate faces the array substrate sandwiching the liquid crystal layer therebetween.

A plurality of subpixels is aligned in a matrix pattern in a first direction and a second direction. The second direction is vertical to the first direction.

The array substrate includes a pixel electrode, a common electrode, a switching element, a gate wire and a source wire.

The pixel electrode and the switching element are provided to each subpixel of a plurality of subpixels.

The switching element switches a source signal according to a gate signal and supplies the switched source signal to the pixel electrode.

The gate wire transmits the gate signal to two or more of the switching elements respectively provided to two or more of the subpixels included in the plurality of subpixels and aligned in the first direction.

The source wire transmits the source signal to two or more of the switching elements respectively provided to two or more of the subpixels included in the plurality of subpixels and aligned in the second direction.

One of the pixel electrode and the common electrode is a first electrode, and other one of the pixel electrode and the common electrode is a second electrode which is disposed between the first electrode and a liquid crystal layer. The second electrode includes a linear portion which is formed on each subpixel, and is a slit-like opening or an electrode finger of a comb electrode. The linear portion includes a bent portion which changes an extension direction of the linear portion.

The color filter substrate includes a color filter layer.

The color filter layer is provided to each subpixel.

At least one substrate selected from the array substrate and the color filter substrate includes at least one light shielding layer.

The at least one light shielding layer overlaps the gate wire, the source wire and the bent portion formed on a first subpixel included in the plurality of subpixels in a plan view, and makes an aperture ratio of the first subpixel lower than an aperture ratio of a second subpixel included in the plurality of subpixels and belonging to a pixel identical to a pixel to which the first subpixel belongs.

The aperture ratio of a subpixel is lowered for chromaticity adjustment of W by shielding a low contrast region formed on the subpixel from light. Consequently, even when the multi-domain structure is adopted and the chromaticity adjustment of W is performed, an overlapping region of an opening region and the low contrast region of the subpixel becomes small, so that it is possible to prevent a decrease in an effective contrast value and display quality caused by formation of the low contrast regions.

These and other objects, features, aspects and advantages of the present invention will become more apparent from the following detailed description of the present invention when taken in conjunction with the accompanying drawings.

DESCRIPTION OF THE PREFERRED EMBODIMENTS

1 First Preferred Embodiment

1.1. Outline of Liquid Crystal Display Apparatus

Figure 1:
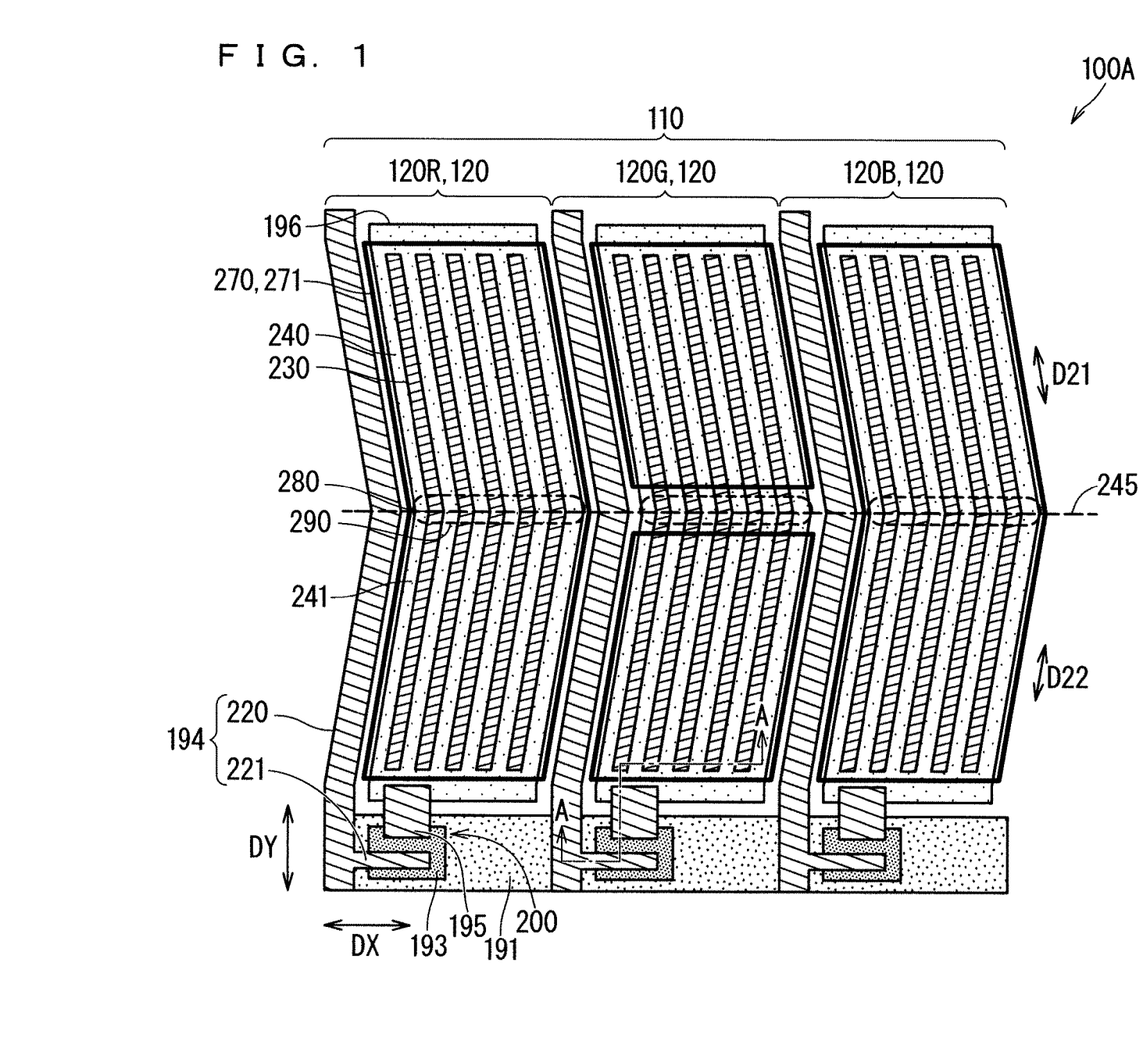
FIG. 1 is a plan view schematically illustrating and focusing on one pixel of a liquid crystal display apparatus according to a first preferred embodiment.

FIG. 1 is a plan view schematically illustrating and focusing on one pixel of a liquid crystal display apparatus according to the first preferred embodiment.

A liquid crystal display apparatus 100A according to the first preferred embodiment illustrated in FIG. 1 includes a plurality of pixels. Each pixel 110 of a plurality of pixels includes subpixels 120R, 120G and 120B. Hence, the liquid crystal display apparatus 100A includes a plurality of subpixels including a plurality of subpixels 120R, a plurality of subpixels 120G and a plurality of subpixels 120B.

A plurality of pixels is aligned in a matrix pattern in a first direction DX and a second direction DY. The second direction DY is vertical to the first direction DX. The subpixels 120R, 120G and 120B belonging to each pixel 110 are linearly aligned in the first direction DX. Hence, a plurality of subpixels provided to the liquid crystal display apparatus 100A is aligned in the matrix pattern in the first direction DX and the second direction DY.

The subpixels 120R, 120G and 120B are respectively subpixels of red (R), green (G) and blue (B) which are three primary colors of light. The color of each pixel 110 is determined based on a color mixing amount of colors of the subpixels 120R, 120G and 120B. The subpixels of three colors of R, G and B may be replaced with subpixels of three or more colors other than R, G and B.

Figure 2:
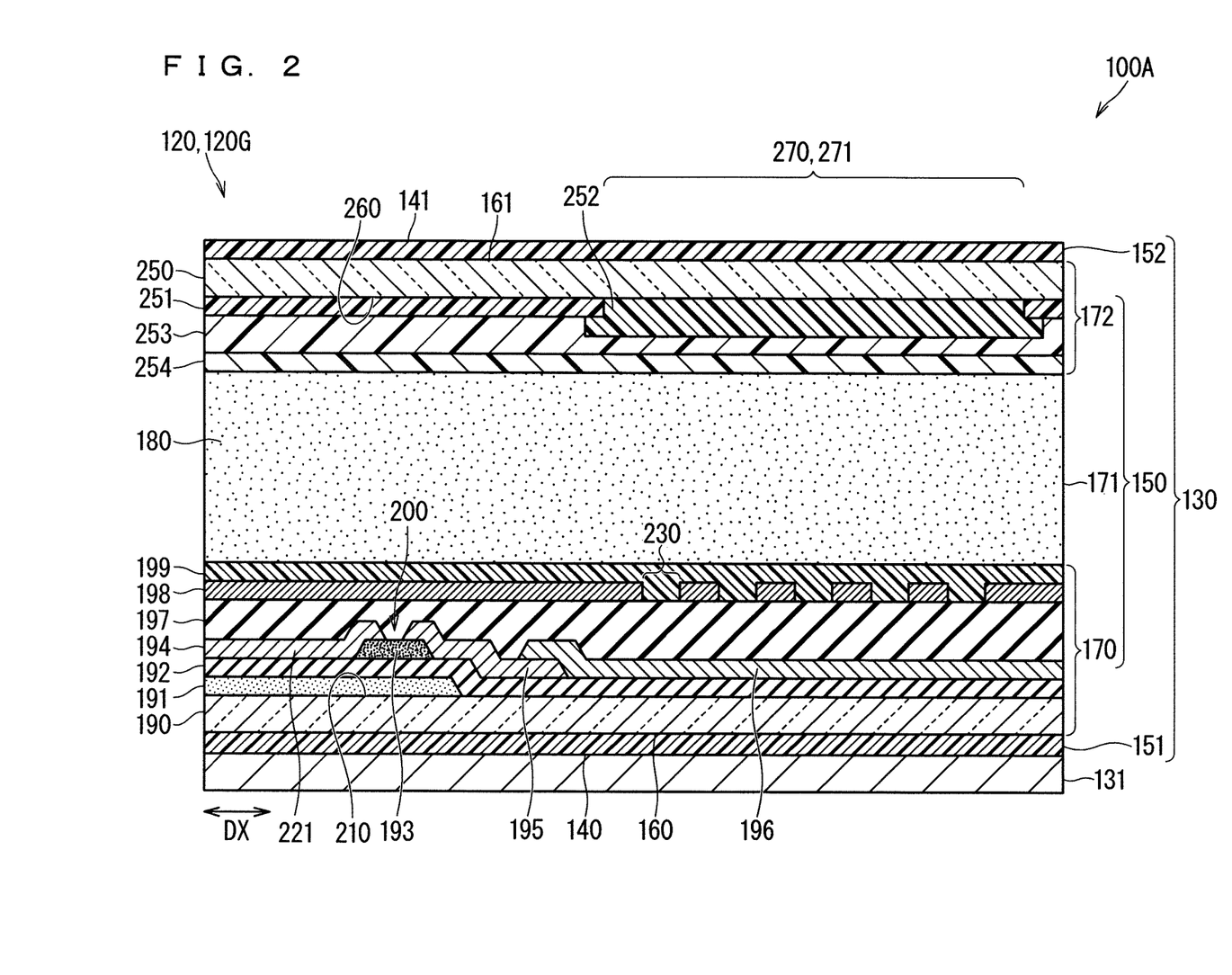
FIG. 2 is a cross-sectional view schematically illustrating and focusing on one subpixel of the liquid crystal display apparatus according to the first preferred embodiment.

FIG. 2 is a cross-sectional view schematically illustrating and focusing on one subpixel of the liquid crystal display apparatus according to the first preferred embodiment. FIG. 2 illustrates a cross section at a position of a cut line A-A in FIG. 1.

As illustrated in FIG. 2, the liquid crystal display apparatus 100A includes a liquid crystal panel 130 and a backlight apparatus 131. The liquid crystal display apparatus 100A may include components other than these components.

The liquid crystal panel 130 is a horizontal electric field type liquid crystal panel. A driving mode of the liquid crystal panel 130 is a fringe field switching (FFS) mode. In this regard, a technique described below may be adopted by a liquid crystal panel of a driving mode other than the FFS mode. For example, the technique described below may be adopted by a liquid crystal panel of an in-plane switching (IPS (registered trademark)) mode. The liquid crystal display apparatus 100A may be a transmission type liquid crystal display apparatus. In this regard, the technique described below may be adopted by a reflective type or semi-transmission type liquid crystal display apparatus.

The backlight apparatus 131 faces a main surface 140 on a back surface side of the liquid crystal panel 130, and irradiates the main surface 140 on the back surface side of the liquid crystal panel 130 with backlight.

When the liquid crystal display apparatus 100A displays an image, the backlight apparatus 131 emits backlight. The emitted backlight enters the main surface 140 on the back surface side of the liquid crystal panel 130, transmits through the liquid crystal panel 130 after entering the main surface 140 on the back surface side of the liquid crystal panel 130, and is emitted from a main surface 141 on a display surface side of the liquid crystal panel 130 after transmitting through the liquid crystal panel 130.

Furthermore, when the liquid crystal display apparatus 100A displays an image, the liquid crystal panel 130 receives an input of an electrical signal, and controls the light transmittance of each subpixel 120 of a plurality of subpixels in the liquid crystal panel 130 according to the inputted electrical signal.

Thus, the image corresponding to the inputted electrical signal is displayed on the main surface 141 on the display surface side of the liquid crystal panel 130.

1.2. Outline of Liquid Crystal Panel

As illustrated in FIG. 2, the liquid crystal panel 130 includes a liquid crystal cell 150, a first polarizing plate 151 and a second polarizing plate 152. The liquid crystal panel 130 may include components other than these components.

The first polarizing plate 151 is stuck to a main surface 160 on a back surface side of the liquid crystal cell 150. The second polarizing plate 152 is stuck to a main surface 161 on a display surface side of the liquid crystal cell 150.

The liquid crystal cell 150 includes an array substrate 170, a liquid crystal layer 171 and a color filter substrate 172. The liquid crystal cell 150 may include components other than these components.

The color filter substrate 172 faces the array substrate 170 sandwiching the liquid crystal layer 171 therebetween. The liquid crystal layer 171 is sandwiched between the array substrate 170 and the color filter substrate 172.

The liquid crystal panel 130 includes an unillustrated seal member and spacers.

The seal member is disposed in a gap 180 between the array substrate 170 and the color filter substrate 172, and is disposed along rim portions of the array substrate 170 and the color filter substrate 172. The seal member sticks the array substrate 170 and the color filter substrate 172 to each other. Thus, a space surrounded by the array substrate 170, the color filter substrate 172 and the seal member is formed in the liquid crystal panel 130. Liquid crystal is filled in the formed space. Thus, the liquid crystal layer 171 is formed.

The spacers are disposed in the gap 180 between the array substrate 170 and the color filter substrate 172, and are disposed in a distributed manner in a widening direction of the array substrate 170 and the color filter substrate 172. The spacers keep the fixed thickness of the gap 180 and keeps the fixed thickness of the liquid crystal layer 171.

When the liquid crystal display apparatus 100A displays an image, the backlight emitted by the backlight apparatus 131 transmits through the first polarizing plate 151, the array substrate 170, the liquid crystal layer 171, the color filter substrate 172 and the second polarizing plate 152 in order.

Furthermore, when the liquid crystal display apparatus 100A displays an image, in each subpixel 120, the electric field applied to the liquid crystal layer 171 is controlled according to the electrical signal inputted to the liquid crystal panel 130, the orientation direction of the liquid crystal molecules included in the liquid crystal layer 171 is controlled according to the applied electric field, and the light transmittance of the liquid crystal panel 130 is controlled according to the orientation direction of the liquid crystal molecules. Consequently, the light transmittance of each subpixel 120 in the liquid crystal panel 130 is controlled according to the inputted electrical signal.

1.3 Array Substrate

1.3.1 Base and Stacked Structure Provided on Array Substrate

As illustrated in FIGS. 1 and 2, the array substrate 170 includes a first transparent substrate 190, gate wires 191, a gate insulation film 192, a semiconductor layer 193, source wires 194, a drain electrode 195, pixel electrodes 196, an inter-electrode insulation film 197, a common electrode 198 and a first orientation film 199. The array substrate 170 may include components other than these components.

The gate wire 191, the gate insulation film 192, the semiconductor layer 193, the source wires 194 and the drain electrode 195 form a thin film transistor (TFT) 200. The TFT 200 is provided to each subpixel 120. A switching element formed by the TFT 200 may be replaced with another switching element.

The first transparent substrate 190 is a base which supports a stacked structure formed by the gate wires 191, the gate insulation film 192, the semiconductor layer 193, the source wires 194, the drain electrode 195, the pixel electrodes 196, the inter-electrode insulation film 197, the common electrode 198 and the first orientation film 199. The first transparent substrate 190 includes an inner main surface 210 which faces the liquid crystal layer 171. The stacked structure is provided on the inner main surface 210 of the first transparent substrate 190. The first transparent substrate 190 has transparency and an insulation property, and is made of glass, quartz, plastics or the like.

The gate wires 191 are disposed on the inner main surface 210 of the first transparent substrate 190, are provided in each row of matrix pattern alignment of a plurality of subpixels provided to the liquid crystal display apparatus 100A, and are disposed at an end portion in the second direction DY of each subpixel 120 belonging to each row extending in the first direction DX. The gate wires 191 extend in the first direction DX.

The gate wire 191 transmits the gate signal to the TFT 200 provided to each subpixel 120 belonging to each row. Hence, the gate wire 191 transmits a gate signal to the two or more TFTs 200 respectively provided to the two or more subpixels, included in a plurality of subpixels provided to the liquid crystal display apparatus 100A and aligned in the first direction DX.

The gate wire 191 is made of a metal or an alloy. The metal is aluminum, molybdenum or the like. The alloy is an aluminum alloy, a molybdenum alloy or the like.

The gate insulation film 192 is disposed on the inner main surface 210 of the first transparent substrate 190, and covers the gate wires 191. The gate insulation film 192 electrically insulates from the gate wires 191 the semiconductor layer 193, the source wires 194 and the drain electrode 195 which overlap the gate wires 191 in the plan view.

The gate insulation film 192 has transparency, and is made of silicon nitride, silicon oxide or the like.

The semiconductor layer 193 is disposed above the inner main surface 210 of the first transparent substrate 190, is disposed on the gate insulation film 192 and overlaps the gate wires 191 in the plan view. The semiconductor layer 193 is provided to each subpixel 120.

The semiconductor layer 193 is made of amorphous silicon, polycrystalline silicon or the like.

The source wires 194 are disposed above the inner main surface 210 of the first transparent substrate 190, are disposed on the gate insulation film 192, are provided in each column of matrix pattern alignment of a plurality of subpixels provided to the liquid crystal display apparatus 100A, and are disposed at an end portion in the first direction DX of each subpixel 120 belonging to each column extending in the second direction DY. The source wires 194 extend in the second direction DY.

The source wire 194 transmits the source signal to the TFT 200 provided to each subpixel 120 belonging to each column. Hence, the source wire 194 transmits a source signal to the two or more TFTs 200 respectively provided to the two or more subpixels, included in a plurality of subpixels provided to the liquid crystal display apparatus 100A and aligned in the second direction DY.

The source wire 194 includes a trunk wire 220 and a branch wire 221. The branch wire 221 is branched from the trunk wire 220. Part of the branch wire 221 is in contact with the surface of the semiconductor layer 193.

The source wire 194 is made of a metal or an alloy. The metal is aluminum, molybdenum or the like. The alloy is an aluminum alloy, a molybdenum alloy or the like.

The drain electrode 195 is disposed above the inner main surface 210 of the first transparent substrate 190, and is disposed on the gate insulation film 192. The drain electrode 195 is provided to each subpixel 120. Part of the drain electrode 195 is close to the source wire 194 and is in contact with the surface of the semiconductor layer 193.

The drain electrode 195 is made of the same material as the material of the source wire 194, and is formed simultaneously with the source wire 194.

The pixel electrodes 196 are disposed above the inner main surface 210 of the first transparent substrate 190, are disposed on the gate insulation film 192 and cover part of the drain electrode 195. The pixel electrodes 196 cover part of the drain electrode 195, so that the pixel electrodes 196 are electrically connected with the drain electrode 195 and the pixel electrodes 196 is electrically connected to the TFTs 200. The pixel electrode 196 is provided to each subpixel 120.

The pixel electrode 196 is a planar electrode.

The pixel electrode 196 is made of a transparent conductive material. The transparent insulation material is indium tin oxide (ITO), indium zinc oxide (IZO) or the like.

The inter-electrode insulation film 197 is disposed above the inner main surface 210 of the first transparent substrate 190, covers the semiconductor layer 193, the source wires 194, the drain electrode 195 and the pixel electrodes 196, and covers the TFTs 200. The inter-electrode insulation film 197 electrically insulates the common electrode 198 which overlaps the semiconductor layer 193, the source wires 194, the drain electrode 195 and the pixel electrodes 196 in the plan view, from the semiconductor layer 193, the source wires 194, the drain electrode 195 and the pixel electrodes 196.

The inter-electrode insulation film 197 has transparency, and is made of silicon nitride, silicon oxide or the like.

The common electrode 198 is disposed above the inner main surface 210 of the first transparent substrate 190, and covers the inter-electrode insulation film 197.

The common electrode 198 is made of a transparent conductive material. The transparent insulation material is ITO, IZO or the like.

The common electrode 198 is an electrode including a plurality of slit-like openings 230. A plurality of slit-like openings 230 is provided to each subpixel 120.

The first orientation film 199 is disposed above the inner main surface 210 of the first transparent substrate 190, and covers the common electrode 198.

The first orientation film 199 is subjected to orientation processing such as rubbing, light irradiation or the like. The orientation processing provides to the first orientation film 199 orientation capability for orienting the liquid crystal molecules included in liquid crystal which contacts the first orientation film 199 to the second direction DY vertical to the first direction DX in which the gate wire 191 extends.

The first orientation film 199 is made of polyimide or the like.

1.3.2 Planar Shapes of Pixel and Subpixel

As illustrated in FIG. 1, the liquid crystal panel 130 includes wires of a lattice pattern including a plurality of gate wires 191 and a plurality of source wires 194. One subpixel region occupied by each subpixel 120 is surrounded by the two neighboring gate wires 191 and the two neighboring source wires 194. Each pixel 110 has a planar shape of a substantially square shape. Hence, each subpixel 120 of the subpixels 120R, 120G and 120B obtained by dividing each pixel 110 by three in the first direction DX has the planar shape of a rectangular shape having short sides parallel to the gate wire 191 and the long sides parallel to the source wire 194.

1.3.3 Replacement of Pixel Electrode and Common Electrode

As illustrated in FIG. 2, in the liquid crystal display apparatus 100A, the pixel electrodes 196 are the first electrodes disposed on a lower layer side, the common electrode 198 is the second electrode disposed on an upper layer side and disposed between the first electrodes and the liquid crystal layer 171, and the common electrode 198 which is the second electrode includes a plurality of slit-like openings 230.

However, the common electrode 198 may be the first electrode disposed on the lower layer side, the pixel electrodes 196 may be the second electrodes disposed on the upper layer side and disposed between the first electrode and the liquid crystal layer 171, and the pixel electrodes 196 which are the second electrodes may include a plurality of slit-like openings 230.

More generally, one of the pixel electrodes 196 and the common electrode 198 is the first electrode disposed on the lower layer, the other one of the pixel electrodes 196 and the common electrode 198 is the second electrode disposed on the upper layer and disposed between the first electrode and the liquid crystal layer 171, and the second electrode includes a plurality of slit-like openings 230.

A plurality of slit-like openings 230 provided to the pixel electrodes 196 is disposed at the same positions as positions at which a plurality of slit-like openings 230 provided to the common electrode 198 illustrated in FIG. 2 is disposed in the plan view.

1.3.4 Extension Direction of Slit-Like Opening

Each slit-like opening 230 of a plurality of slit-like openings 230 is a linear portion having a thin, long and linear planar shape as illustrated in FIG. 1.

Each slit-like opening 230 extends in extension directions D21 and D22 inclining from the first direction DX in which the gate wires 191 extend. The liquid crystal panel 130 adopts the multi-domain structure. Hence, each slit-like opening 230 includes two portions which respectively extend in the two different extension directions D21 and D22. Instead of the two portions which respectively extend in the two different extension directions D21 and D22, three or more portions which respectively extend in three or more different extension directions may be provided. Inclination angles of the extension directions D21 and D22 with respect to the first direction DX in which the gate wires 191 extend differ from each other.

Each subpixel 120 includes a first region 240 and a second region 241 divided by a boundary line 245 in the plan view. The boundary line 245 extends in the first direction DX in which the gate wires 191 extend. The first region 240 is disposed on one side in the second direction DY of each subpixel 120, and occupies half of each subpixel 120. The second region 241 is disposed on the other side in the second direction DY of each subpixel 120, and occupies half of each subpixel 120.

Each slit-like opening 230 is disposed across the first region 240 and the second region 241 in the plan view, continues from the first region 240 to the second region 241, extends in the first extension direction D21 in the first region 240, and extends in the second extension direction D22 in the second region 241. The second extension direction D22 is a direction different from the first extension direction D21, and forms linear symmetry with the first extension direction D21 with respect to the boundary line 245.

The first extension direction D21 is a direction which inclines at 80° clockwise from the first direction DX in which the gate wires 191 extend. The second extension direction D22 is a direction which inclines at 80° counterclockwise from the first direction DX in which the gate wires 191 extend.

1.4 Color Filter Substrate

1.4.1 Base and Stacked Structure Provided on Color Filter Substrate

As illustrated in FIG. 2, the color filter substrate 172 includes a second transparent substrate 250, a light shielding layer 251, color filter layers 252, an overcoat layer 253 and a second orientation film 254. The color filter substrate 172 may include components other than these components.

The second transparent substrate 250 is a base which supports the stacked structure formed by the light shielding layer 251, the color filter layers 252, the overcoat layer 253 and the second orientation film 254. The second transparent substrate 250 includes an inner main surface 260 which faces the liquid crystal layer 171. The stacked structure is provided on the inner main surface 260 of the second transparent substrate 250. The second transparent substrate 250 has transparency and an insulation property, and is made of glass, quartz, plastics or the like.

The light shielding layer 251 is disposed on the inner main surface 260 of the second transparent substrate 250, and overlaps an opaque region of the array substrate 170 in the plan view. Hence, the light shielding layer 251 overlaps the gate wires 191, the source wires 194 and the drain electrode 195 made of an opaque material in the plan view.

As illustrated in FIGS. 1 and 2, each subpixel 120 includes a non-light shielding region 270 in which the light shielding layer 251 is not disposed, and an opening region 271 which allows transmission of backlight. In the liquid crystal display apparatus 100A, the opening region 271 of each subpixel 120 matches with the non-light shielding region 270 of each subpixel 120.

The color filter layer 252 is disposed on the inner main surface 260 of the second transparent substrate 250, and is disposed in the non-light shielding region 270. The color filter layer 252 is provided to each subpixel 120.

The color filter layers 252 provided to the subpixels 120R, 120G and 120B respectively allow transmission of light of R, G and B.

The overcoat layer 253 is disposed above the inner main surface 260 of the second transparent substrate 250, and covers the light shielding layer 251 and the color filter layer 252.

The overcoat layer 253 removes a difference in height produced by the color filter layers 252 provided to subpixels 120R, 120G and 120B and provides a flat main surface, and blocks an outflow of impurities from the light shielding layer 251 and the overcoat layer 253 to the liquid crystal layer 171.

The overcoat layer 253 is made of a transparent resin material. The transparent resin material is a photoresist or the like.

The second orientation film 254 is disposed on the inner main surface 260 of the second transparent substrate 250, and covers the overcoat layer 253.

The second orientation film 254 is subjected to orientation processing such as rubbing, light irradiation or the like. Thus, the second orientation film 254 has orientation capability for orienting the liquid crystal molecules included in liquid crystal which contacts the second orientation film 254 to the second direction DY vertical to the first direction DX in which the gate wires 191 extend.

The second orientation film 254 is made of polyimide.

1.5 Change in Orientation Direction Due to Electric Field

The TFT 200 switches a source signal transmitted through the source wire 194 according to the gate signal transmitted through the gate wire 191, and supplies the switched source signal to the pixel electrode 196. A potential difference given between the pixel electrode 196 and the common electrode 198 is controlled according to the switched source signal.

The pixel electrode 196 includes a plurality of facing portions which respectively face a plurality of slit-like openings 230 formed on the common electrode 198. When the TFT 200 changes to an on state, the potential difference is given between the pixel electrode 196 and the common electrode 198, an electric field which is relayed via a plurality of slit-like openings 230 and the liquid crystal layer 171 is produced between a plurality of facing portions of the pixel electrode 196, and the common electrode 198, the produced electric field changes the orientation direction of the liquid crystal molecules included in the liquid crystal layer 171 from the second direction DY, and the light transmittance of each subpixel 120 in the liquid crystal panel 130 is changed.

In the liquid crystal panel 130, the pixel electrodes 196, the common electrode 198 and the inter-electrode insulation film 197 form an auxiliary capacitance. The auxiliary capacitance is formed, so that, until a predetermined time passes after the TFTs 200 change from the on state to an off state, a state where the potential difference is given between the pixel electrodes 196 and the common electrode 198 is maintained, and the electric field produced between a plurality of facing portions formed on the pixel electrodes 196, and the common electrode 198 is maintained.

1.6 Bent Portion

As illustrated in FIG. 1, each slit-like opening 230 includes a bent portion 280 which changes the extension direction of each slit-like opening 230 from the first extension direction D21 to the second extension direction D22.

Near the bent portion 280, the electric field produced between the pixel electrodes 196 and the common electrode 198 is disturbed, thereby the light transmittance of the liquid crystal panel 130 being hard to change even when the TFT 200 is changed to the on state. Hence, a low contrast region 290 in which a contrast value locally lowers is formed near the bent portion 280.

When the light shielding layer 251 does not overlap the low contrast region 290 in each subpixel 120 in the plan view, a ratio of an area occupied by the low contrast region 290 with respect to an area occupied by the non-light shielding region 270 is high, and an effective contrast value of the liquid crystal display apparatus 100A lowers.

1.7 Shielding of Low Contrast Region Formed on Green Subpixel from Light

The aperture ratio of each subpixel 120 indicates a ratio of an area occupied by the opening region 271 of each subpixel 120 with respect to the area occupied by each subpixel 120.

In the liquid crystal display apparatus 100A, the ratio of the aperture ratios of the subpixels 120R, 120G and 120B is adjusted for chromaticity adjustment of W for adjusting the chromaticity of W displayed by each pixel 110 to a desired chromaticity. More specifically, the subpixel 120G is a first subpixel having a relatively low aperture ratio, and each subpixel of the subpixels 120R and 120B belonging to the same pixel as a pixel to which the subpixel 120G belongs is a second subpixel having a relatively high aperture ratio. Consequently, the aperture ratio of the subpixel 120G is made lower than the aperture ratios of the subpixels 120R and 120B. Furthermore, in the liquid crystal display apparatus 100A, the aperture ratio of the subpixel 120G is made lower than the aperture ratios of the subpixels 120R and 120B by shielding the low contrast region 290 formed on the subpixel 120G from light and not shielding the low contrast regions 290 formed on the subpixels 120R and 120B from light.

To shield the low contrast region 290 formed on the subpixel 120G from light and not to shield the low contrast regions 290 formed on the subpixels 120R and 120B from light, the light shielding layer 251 overlaps the bent portion 280 formed on the subpixel 120G, and does not overlap the bent portions 280 formed on the subpixels 120R and 120B in the plan view. Thanks to the light shielding layer 251, the non-light shielding region 270 of the subpixel 120G does not overlap the low contrast region 290 formed on the subpixel 120G, and the non-light shielding regions 270 of the subpixels 120R and 120B overlap the low contrast regions 290 formed on the subpixels 120R and 120B, respectively.

The non-light shielding region 270 of the subpixel 120G does not overlap the low contrast region 290 formed on the subpixel 120G, so that it is possible to prevent a decrease in an effective contrast value and display quality caused by formation of the low contrast regions 290 in the subpixel 120G.

The low contrast regions 290 are formed not only in the subpixel 120G but also in the subpixels 120R and 120B. However, in the liquid crystal display apparatus 100A, while the low contrast region 290 formed on the subpixel 120G is shielded from light, the low contrast regions 290 formed on the subpixels 120R and 120B are not shielded from light. In this case, too, a decrease in an effective contrast value and a decrease in display quality can be sufficiently prevented. This is because, when an influence of each color on a brightness value regarding wavelength characteristics, i.e., a luminosity factor indicating a sensitivity with respect to a brightness difference of each color viewed by a person is focused on, the luminosity factor of G which is the color of the subpixel 120G is higher than the luminosity factor of R which is the color of the subpixel 120R and the luminosity factor of B which is the color of the subpixel 120B.

When the non-light shielding region 270 of the subpixel 120G overlaps part of the low contrast region 290 formed on the subpixel 120G, the above effect is hardly obtained. However, even when the non-light shielding region 270 of the subpixel 120G overlaps part of the low contrast region 290 formed on the subpixel 120G, the above effect is obtained compared to a case where the non-light shielding region 270 of the subpixel 120G overlaps the entire low contrast region 290 formed on the subpixel 120G. Naturally, an overlapping region of the non-light shielding region 270 of the subpixel 120G and the low contrast region 290 formed on the subpixel 120G is minimized as much as possible.

1.8 Advantage of Liquid Crystal Display Apparatus

In the liquid crystal display apparatus 100A, the aperture ratio of the subpixel 120G is lowered for chromaticity adjustment of W by shielding the low contrast region 290 formed on the subpixel 120G from light. Hence, even when the multi-domain structure is adopted and the chromaticity adjustment of W is performed, the overlapping region of the opening region 271 and the low contrast region 290 in the subpixel 120G becomes small, so that it is possible to prevent a decrease in an effective contrast value and display quality caused by formation of the low contrast regions 290.

2 Second Preferred Embodiment

Figure 3:
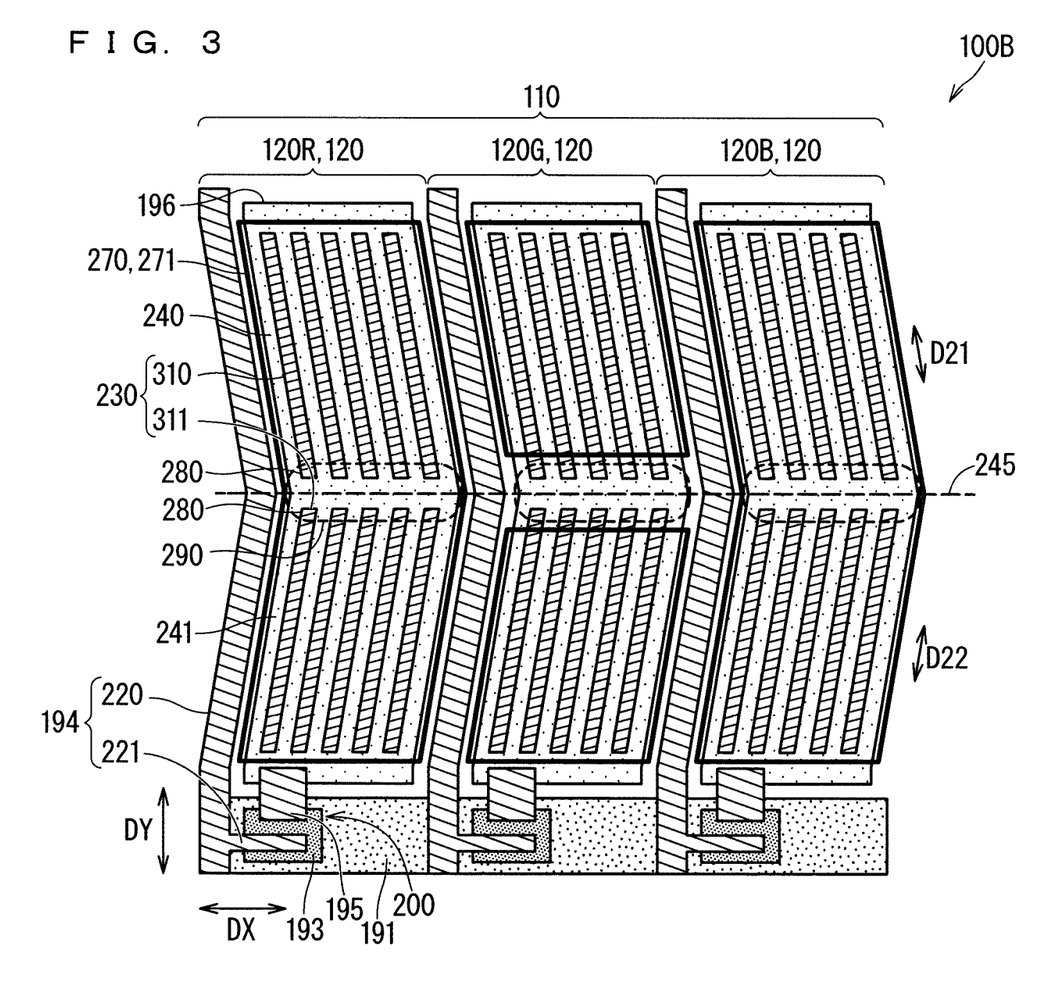
FIG. 3 is a plan view schematically illustrating and focusing on one pixel of a liquid crystal display apparatus according to a second preferred embodiment.

FIG. 3 is a plan view schematically illustrating and focusing on one pixel of a liquid crystal display apparatus according to the second preferred embodiment.

Main differences between the liquid crystal display apparatus 100A according to the first preferred embodiment illustrated in FIGS. 1 and 2, and a liquid crystal display apparatus 100B according to the second preferred embodiment illustrated in FIG. 3 are as follows.

(1) In the liquid crystal display apparatus 100A, each slit-like opening 230 continues from the first region 240 to the second region 241. By contrast with this, in the liquid crystal display apparatus 100B, each slit-like opening 230 is divided into a first portion 310 disposed in the first region 240, and a second portion 311 disposed in the second region 241.

(2) The non-light shielding region 270 of the subpixel 120G provided to the liquid crystal display apparatus 100B is narrower than the non-light shielding region 270 of the subpixel 120G provided to the liquid crystal display apparatus 100A in the second direction DY.

A configuration of the liquid crystal display apparatus 100B related to the above main differences will be described below. In a case where components of the liquid crystal display apparatus 100B correspond to the components of the liquid crystal display apparatus 100A, the same reference numerals as reference numerals assigned to the latter components will be assigned to the former components, and overlapping description of the former components will be omitted.

The liquid crystal display apparatus 100B differs from the liquid crystal display apparatus 100A in that the common electrode 198 includes an opening dividing portion.

The opening dividing portion is disposed at the bent portion 280 formed on each slit-like opening 230. Hence, each slit-like opening 230 includes the first portion 310 and the second portion 311 which are divided from each other by the opening dividing portion. In the plan view, the first portion 310 is disposed in the first region 240, and extends in the first extension direction D21. In the plan view, the second portion 311 is disposed in the second region 241, and extends in the second extension direction D22. The second extension direction D22 is a direction different from the first extension direction D21, and forms linear symmetry with the first extension direction D21 with respect to a boundary line 245.

When each slit-like opening 230 is divided and a push of a finger or the like applies an external pressure to a display surface of the liquid crystal panel 130, the orientation direction of liquid crystal molecules included in the liquid crystal layer 171 is hardly disturbed. On the other hand, each slit-like opening 230 is divided, so that a region in which the electric field produced between the pixel electrodes 196 and the common electrode 198 is disturbed widens in the second direction DY, and the low contrast regions 290 widen in the second direction DY.

Similar to the liquid crystal display apparatus 100A, in the liquid crystal display apparatus 100B, the ratio of the aperture ratios of the subpixels 120R, 120G and 120B is adjusted for chromaticity adjustment of W for adjusting the chromaticity of W displayed by each pixel 110 to a desired chromaticity. More specifically, the subpixel 120G is a first subpixel having a relatively low aperture ratio, and each subpixel of the subpixels 120R and 120B belonging to the same pixel as a pixel to which the subpixel 120G belongs is the second subpixel having a relatively high aperture ratio. Consequently, the aperture ratio of the subpixel 120G is made lower than the aperture ratios of the subpixels 120R and 120B. Furthermore, similar to the liquid crystal display apparatus 100A, in the liquid crystal display apparatus 100B, the aperture ratio of the subpixel 120G is made lower than the aperture ratios of the subpixels 120R and 120B by shielding the low contrast region 290 formed on the subpixel 120G from light and not shielding the low contrast regions 290 formed on the subpixels 120R and 120B from light.

To shield the low contrast region 290 formed on the subpixel 120G from light and not to shield the low contrast regions 290 formed on the subpixels 120R and 120B from light, the light shielding layer 251 overlaps the bent portion 280 formed on the subpixel 120G, and does not overlap the bent portions 280 formed on the subpixels 120R and 120B in the plan view. Thanks to the light shielding layer 251, the non-light shielding region 270 of the subpixel 120G does not overlap the low contrast region 290 formed on the subpixel 120G, and the non-light shielding regions 270 of the subpixels 120R and 120B overlap the low contrast regions 290 formed on the subpixels 120R and 120B, respectively.

The light shielding layer 251 includes a portion which overlaps the bent portion 280 formed on the subpixel 120G in the plan view. The width in the second direction DY of this portion is adjusted such that the non-light shielding region 270 of the subpixel 120G does not overlap the low contrast region 290 formed on the subpixel 120G in the plan view, and such a ratio of aperture ratios of the subpixels 120R, 120G and 120B that chromaticity of W displayed by each pixel 110 becomes a desired chromaticity can be obtained.

The non-light shielding region 270 of the subpixel 120G does not overlap the low contrast region 290 formed on the subpixel 120G, so that it is possible to prevent a decrease in an effective contrast value and display quality caused by formation of the low contrast regions 290 in the subpixel 120G.

Similar to the liquid crystal display apparatus 100A, according to the liquid crystal display apparatus 100B, even when the multi-domain structure is adopted and the chromaticity adjustment of W is performed, the overlapping region of the opening region 271 and the low contrast region 290 in the subpixel 120G becomes small, so that it is possible to prevent a decrease in an effective contrast value and display quality caused by formation of the low contrast regions 290.

In addition, the liquid crystal display apparatus 100B can both prevent the disturbance of the orientation direction of the liquid crystal molecules included in the liquid crystal layer 171 in a case where an external pressure is applied, and prevent a decrease in an effective contrast value and display quality.

3 Third Preferred Embodiment

Figure 4:
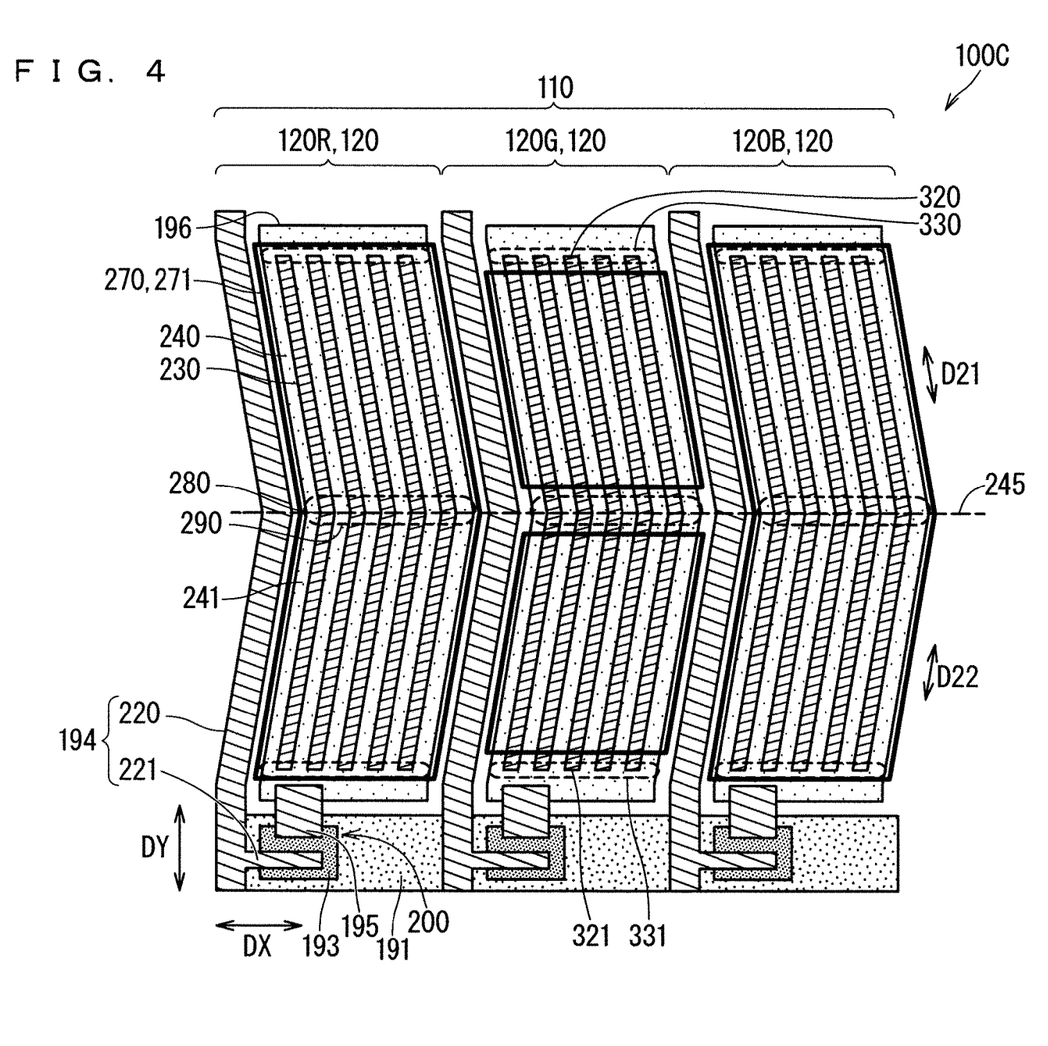
FIG. 4 is a plan view schematically illustrating and focusing on one pixel of a liquid crystal display apparatus according to a third preferred embodiment.

FIG. 4 is a plan view schematically illustrating and focusing on one pixel of a liquid crystal display apparatus according to the third preferred embodiment.

Main differences between the liquid crystal display apparatus 100A according to the first preferred embodiment illustrated in FIGS. 1 and 2, and a liquid crystal display apparatus 100C according to the third preferred embodiment illustrated in FIG. 4 are as follows.

(1) In the liquid crystal display apparatus 100A, the non-light shielding region 270 of the subpixel 120G just does not overlap the low contrast region 290 formed near the bent portion 280 formed on each slit-like opening 230 formed on the subpixel 120G in a plan view. By contrast with this, in the liquid crystal display apparatus 100C, the non-light shielding region 270 of the subpixel 120G does not overlap the low contrast region 290 formed near the bent portion 280 formed on each slit-like opening 230 formed on the subpixel 120G, and, in addition, does not overlap low contrast regions 330 and 331 respectively formed near end portions 320 and 321 of each slit-like opening 230 formed on the subpixel 120G, in the plan view.

A configuration of the liquid crystal display apparatus 100C related to the above main differences will be described below. In a case where components of the liquid crystal display apparatus 100C correspond to the components of the liquid crystal display apparatus 100A, the same reference numerals as reference numerals assigned to the latter components will be assigned to the former components, and overlapping description of the former components will be omitted.

As described above, the low contrast region 290 is formed near the bent portion 280 formed on each slit-like opening 230. In addition, the low contrast regions 330 and 331 are formed near the one end portion 320 and the other end portion 321, respectively, in the second direction DY of each slit-like opening 230. The end portions 320 and 321 of each slit-like opening 230 are apart from the bent portion 280 formed on each slit-like opening 230, and is on a side opposite to the bent portion 280 formed on each slit-like opening 230.

Similar to the liquid crystal display apparatus 100A, in the liquid crystal display apparatus 100C, the ratio of the aperture ratios of the subpixels 120R, 120G and 120B is adjusted for chromaticity adjustment of W for adjusting the chromaticity of W displayed by each pixel 110 to a desired chromaticity. More specifically, the subpixel 120G is the first subpixel having a relatively low aperture ratio, and each subpixel of the subpixels 120R and 120B belonging to the same pixel as a pixel to which the subpixel 120G belongs is the second subpixel having a relatively high aperture ratio. Consequently, the aperture ratio of the subpixel 120G is made lower than the aperture ratios of the subpixels 120R and 120B. In this regard, unlike the liquid crystal display apparatus 100A, in the liquid crystal display apparatus 100C, the aperture ratio of the subpixel 120G is made lower than the aperture ratios of the subpixels 120R and 120B by shielding the low contrast regions 290, 330 and 331 formed on the subpixel 120G from light and not shielding the low contrast regions 290, 330 and 331 formed on the subpixels 120R and 120B from light.

To shield the low contrast regions 290, 330 and 331 formed on the subpixel 120G from light and not to shield the low contrast regions 290, 330 and 331 formed on the subpixels 120R and 120B from light, the light shielding layer 251 overlaps the bent portion 280, the end portion 320 and the end portion 321 formed on the subpixel 120G, and does not overlap the bent portion 280, the end portion 320 and the end portion 321 formed on the subpixels 120R and 120B in the plan view. Thanks to the light shielding layer 251, the non-light shielding region 270 of the subpixel 120G does not overlap the low contrast regions 290, 330 and 331 formed on the subpixel 120G, and the non-light shielding regions 270 of the subpixels 120R and 120B overlap the low contrast regions 290, 330 and 331 formed on the subpixels 120R and 120B, respectively.

The non-light shielding region 270 of the subpixel 120G does not overlap the low contrast regions 290, 330 and 331 formed on the subpixel 120G, so that it is possible to prevent a decrease in an effective contrast value and display quality caused by formation of the low contrast regions 290, 330 and 331 in the subpixel 120G.

Similar to the liquid crystal display apparatus 100A, according to the liquid crystal display apparatus 100C, even when the multi-domain structure is adopted and the chromaticity adjustment of W is performed, the overlapping region of the opening region 271 and the low contrast region 290 in the subpixel 120G becomes small, so that it is possible to prevent a decrease in an effective contrast value and display quality caused by formation of the low contrast region 290.

In addition, the liquid crystal display apparatus 100C can prevent a decrease in an effective contrast value and display quality caused by formation of the low contrast regions 330 and 331.

A total of areas occupied by the low contrast regions 290, 330 and 331 is larger than an area occupied by the low contrast regions 290. Hence, an effect of preventing a decrease in an effective contrast value and display quality in the liquid crystal display apparatus 100C is greater than that of the liquid crystal display apparatus 100A.

4 Fourth Preferred Embodiment

Figure 5:
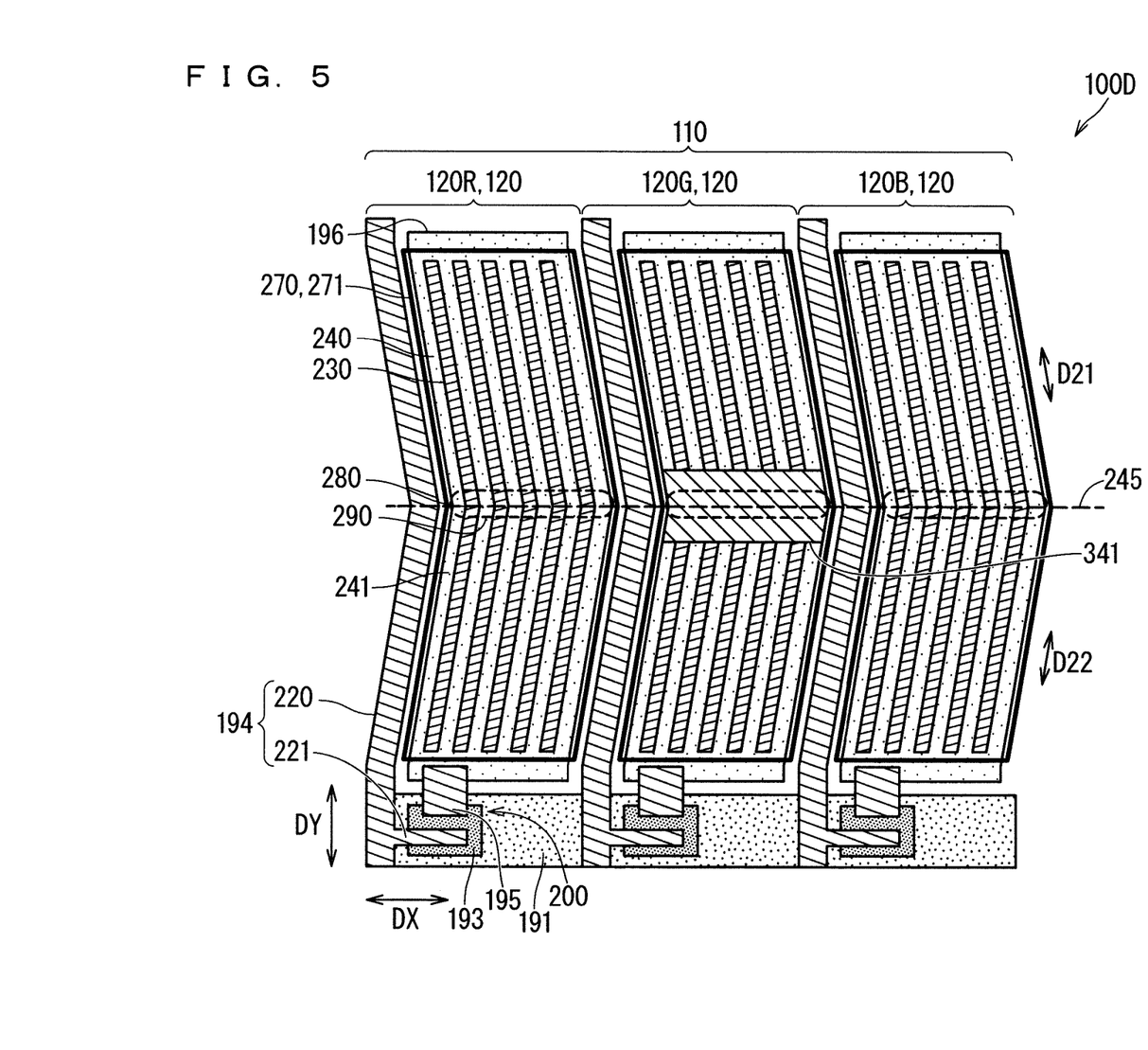
FIG. 5 is a plan view schematically illustrating and focusing on one pixel of a liquid crystal display apparatus according to a fourth preferred embodiment.

FIG. 5 is a plan view schematically illustrating and focusing on one pixel of a liquid crystal display apparatus according to the fourth preferred embodiment.

Main differences between the liquid crystal display apparatus 100A according to the first preferred embodiment illustrated in FIGS. 1 and 2, and a liquid crystal display apparatus 100D according to the fourth preferred embodiment illustrated in FIG. 5 are as follows.

(1) In the liquid crystal display apparatus 100A, the color filter substrate 172 includes the light shielding layer 251 which overlaps the gate wires 191, the source wires 194, the drain electrode 195 and the bent portions 280 formed on the subpixels 120G in the plan view. By contrast with this, in the liquid crystal display apparatus 100D, the color filter substrate 172 includes the first light shielding layer 251 which overlaps the gate wires 191, the source wires 194 and the drain electrode 195 in the plan view, and the array substrate 170 includes a second light shielding layer 341 which overlaps the bent portions 280 formed on the subpixels 120G in the plan view.

What can be understood from a difference between the liquid crystal display apparatus 100A and the liquid crystal display apparatus 100D is that at least one substrate selected from the array substrate 170 and the color filter substrate 172 needs to include at least one light shielding layer which overlaps the gate wires 191, the source wires 194, the drain electrode 195 and the bent portions 280 formed on the subpixels 120G.

A configuration of the liquid crystal display apparatus 100D related to the above main differences will be described below. In a case where components of the liquid crystal display apparatus 100D correspond to the components of the liquid crystal display apparatus 100A, the same reference numerals as reference numerals assigned to the latter components will be assigned to the former components, and overlapping description of the former components will be omitted.

Similar to the liquid crystal display apparatus 100A, in the liquid crystal display apparatus 100D, the ratio of the aperture ratios of the subpixels 120R, 120G and 120B is adjusted for chromaticity adjustment of W for adjusting the chromaticity of W displayed by each pixel 110 to a desired chromaticity. More specifically, the subpixel 120G is the first subpixel having a relatively low aperture ratio, and each subpixel of the subpixels 120R and 120B belonging to the same pixel as a pixel to which the subpixel 120G belongs is the second subpixel having a relatively high aperture ratio. Consequently, the aperture ratio of the subpixel 120G is made lower than the aperture ratios of the subpixels 120R and 120B. Furthermore, similar to the liquid crystal display apparatus 100A, in the liquid crystal display apparatus 100D, the aperture ratio of the subpixel 120G is made lower than the aperture ratios of the subpixels 120R and 120B by shielding the low contrast region 290 formed on the subpixel 120G from light and not shielding the low contrast regions 290 formed on the subpixels 120R and 120B from light.

Unlike the liquid crystal display apparatus 100A, in the liquid crystal display apparatus 100D, the color filter substrate 172 includes the first light shielding layer 251, and the array substrate 170 includes the second light shielding layer 341. The second light shielding layer 341 is provided to the subpixel 120G.

Each subpixel 120 includes the non-light shielding region 270 in which the first light shielding layer 251 is not disposed, and includes the opening region 271 which allows transmission of backlight. The non-light shielding regions 270 of the subpixels 120R, 120G and 120B have the same planar shape. The opening region 271 of the subpixel 120G is a region obtained by removing a region in which the second light shielding layer 341 is disposed from the non-light shielding region 270 of the subpixel 120G. The opening regions 271 of the subpixels 120R and 120R match with the non-light shielding regions 270 of the subpixels 120R and 120B, respectively.

The second light shielding layer 341 may be disposed inside a stacked structure disposed on the inner main surface 210 of the first transparent substrate 190, and may be disposed on an outer main surface of the first transparent substrate 190 which faces the first polarizing plate 151.

The second light shielding layer 341 is made of an opaque material. The opaque material is a metal or an alloy.

The second light shielding layer 341 can be simultaneously formed with the gate wires 191 provided to the array substrate 170 and made of the opaque material, and can be simultaneously formed with the source wires 194 and the drain electrode 195 provided to the array substrate 170 and made of the opaque material. Hence, the second light shielding layer 341 can be formed without adding a manufacturing process.

The first light shielding layer 251 overlaps the gate wires 191, the source wires 194 and the drain electrode 195 in the plan view.

To shield the low contrast region 290 formed on the subpixel 120G from light and not to shield the low contrast regions 290 formed on the subpixels 120R and 120B from light, the second light shielding layer 341 overlaps the bent portion 280 formed on the subpixel 120G, and does not overlap the bent portions 280 formed on the subpixels 120R and 120B in the plan view. Thanks to the first light shielding layer 251 and the second light shielding layer 341, the opening region 271 of the subpixel 120G does not overlap the low contrast region 290 formed on the subpixel 120G, and the opening regions 271 of the subpixels 120R and 120B overlap the low contrast regions 290 formed on the subpixels 120R and 120B, respectively.

The opening region 271 of the subpixel 120G does not overlap the low contrast region 290 formed on the subpixel 120G, so that it is possible to prevent a decrease in an effective contrast value and display quality caused by formation of the low contrast region 290 in the subpixel 120G.

Similar to the liquid crystal display apparatus 100A, according to the liquid crystal display apparatus 100D, even when the multi-domain structure is adopted and the chromaticity adjustment of W is performed, the overlapping region of the opening region 271 and the low contrast region 290 in the subpixel 120G becomes small, so that it is possible to prevent a decrease in an effective contrast value and display quality caused by formation of the low contrast regions 290.

In addition, according to the liquid crystal display apparatus 100D, both of each slit-like opening 230 for determining a formation position of the low contrast region 290, and the second light shielding layer 341 which needs to overlap the low contrast region 290 in the plan view are provided to the array substrate 170. Hence, even when a relative position of the color filter substrate 172 with respect to the array substrate 170 is shifted from a position at which the relative position needs to be located to a widening direction of the array substrate 170 and the color filter substrate 172, a state where the second light shielding layer 341 overlaps the low contrast region 290 in the plan view is maintained, and an effect of preventing a decrease in an effective contrast value and display quality is maintained.

5 Fifth Preferred Embodiment

Figure 6:
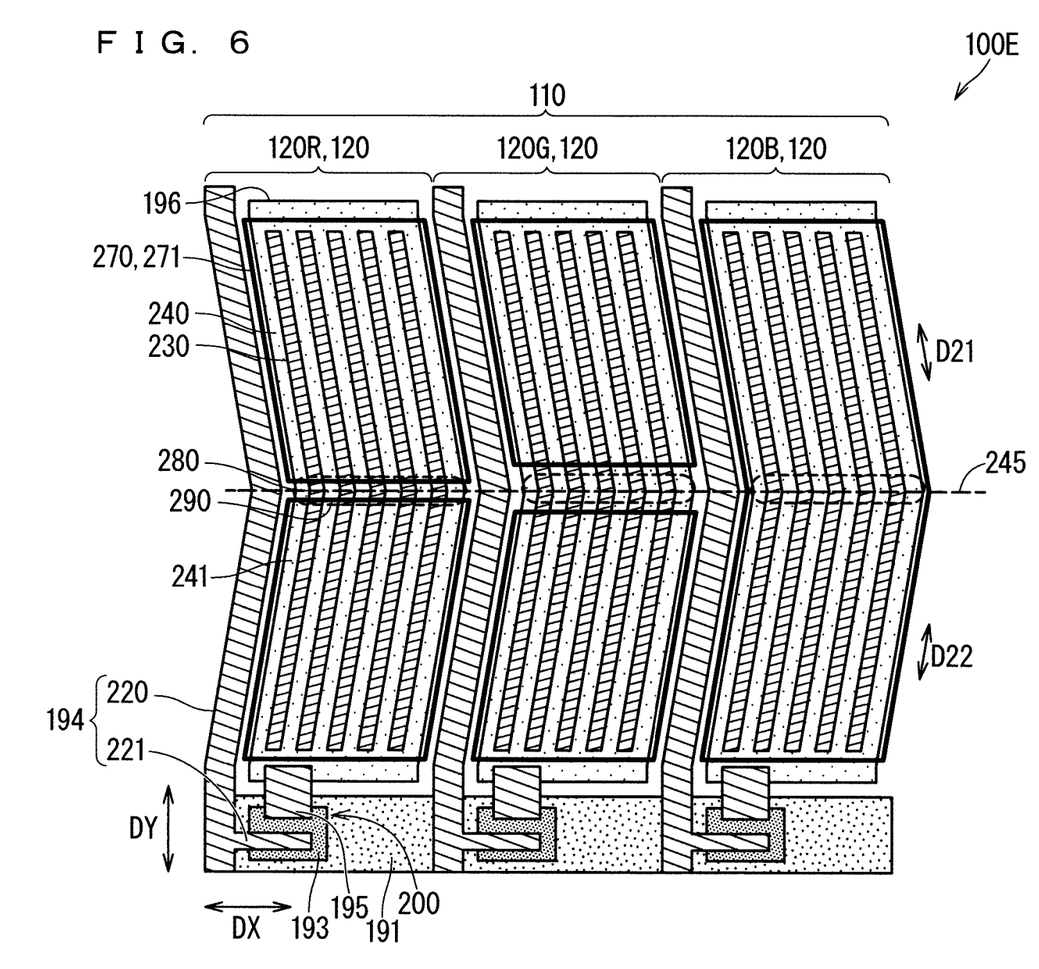
FIG. 6 is a plan view schematically illustrating and focusing on one pixel of a liquid crystal display apparatus according to a fifth preferred embodiment.

FIG. 6 is a plan view schematically illustrating and focusing on one pixel of a liquid crystal display apparatus according to the fifth preferred embodiment.

Main differences between the liquid crystal display apparatus 100A according to the first preferred embodiment illustrated in FIGS. 1 and 2, and a liquid crystal display apparatus 100E according to the fifth preferred embodiment illustrated in FIG. 6 are as follows.

(1) In the liquid crystal display apparatus 100A, the non-light shielding region 270 of the subpixel 120R overlaps the entire low contrast region 290 formed on the subpixel 120R in the plan view. By contrast with this, in the liquid crystal display apparatus 100E, the non-light shielding region 270 of the subpixel 120R does not overlap part of the low contrast region 290 formed on the subpixel 120R in the plan view.

A configuration of the liquid crystal display apparatus 100E related to the above main differences will be described below. In a case where components of the liquid crystal display apparatus 100E correspond to the components of the liquid crystal display apparatus 100A, the same reference numerals as reference numerals assigned to the latter components will be assigned to the former components, and overlapping description of the former components will be omitted.

Similar to the liquid crystal display apparatus 100A, in the liquid crystal display apparatus 100E, the ratio of the aperture ratios of the subpixels 120R, 120G and 120B is adjusted for chromaticity adjustment of W for adjusting the chromaticity of W displayed by each pixel 110 to a desired chromaticity. In this regard, unlike the liquid crystal display apparatus 100A, in the liquid crystal display apparatus 100E, the subpixel 120G is the first subpixel having a relatively low aperture ratio, the subpixel 120B is the second subpixel having a relatively high aperture ratio, and the subpixel 120R is a third subpixel having an intermediate aperture ratio between the relatively low aperture ratio and the relatively high aperture ratio. Thus, the aperture ratio of the subpixel 120G is made lower than the aperture ratios of the subpixels 120R and 120B, and the aperture ratio of the subpixel 120R is made lower than the aperture ratio of the subpixel 120B and is higher than the aperture ratio of the subpixel 120G. Furthermore, unlike the liquid crystal display apparatus 100A, in the liquid crystal display apparatus 100E, the aperture ratio of the subpixel 120G is made lower than the aperture ratios of the subpixels 120R and 120B, and the aperture ratio of the subpixel 120R is made lower than the aperture ratio of the subpixel 120B and is made higher than the aperture ratio of the subpixel 120G by shielding the entire low contrast region 290 formed on the subpixel 120G from light, shielding part of the low contrast region 290 formed on the subpixel 120R from light and not shielding the low contrast region 290 formed on the subpixel 120B from light. This is done because the luminosity factor of R which is the color of the subpixel 120R is higher than the luminosity factor of B which is the color of the subpixel 120B and the luminosity factor of G which is the color of the subpixel 120G.

To shield the entire low contrast region 290 formed on the subpixel 120G from light, to shield part of the low contrast region 290 formed on the subpixel 120R from light and not to shield the low contrast region 290 formed on the subpixel 120B from light, the light shielding layer 251 overlaps the bent portions 280 formed on the subpixels 120G and 120R and the bent portion 280 formed on the subpixel 120B in the plan view. In this case, an overlapping region of the bent portion 280 and the light shielding layer 251 formed on the subpixel 120G is made smaller than an overlapping region of the bent portion 280 and the light shielding layer 251 formed on the subpixel 120R. Thanks to the light shielding layer 251, the non-light shielding region 270 of the subpixel 120G does not overlap the low contrast region 290 formed on the subpixel 120G, the non-light shielding region 270 of the subpixel 120R does not overlap part of the low contrast region 290 formed on the subpixel 120R, and the non-light shielding region 270 of the subpixel 120B does not overlap the low contrast region 290 formed on the subpixel 120B.

To prevent a decrease in an effective contrast value, the non-light shielding region 270 of the subpixel 120R desirably does not overlap the low contrast region 290 formed on the subpixel 120R. However, the non-light shielding region 270 of the subpixel 120R overlaps part of the low contrast region 290 formed on the subpixel 120R. This is because it is prioritized to obtain such a ratio of the aperture ratios of the subpixels 120R, 120G and 120B that the chromaticity of W displayed by each pixel 110 becomes a desired chromaticity. In this case, too, by reducing an area in which the non-light shielding region 270 of the subpixel 120R and the low contrast region 290 formed on the subpixel 120R overlap in the plan view as much as possible, it is possible to obtain an effect of preventing a decrease in the effective contrast value compared to a case where the non-light shielding region 270 of the subpixel 120R and the entire low contrast region 290 formed on the subpixel 120R overlap in the plan view.

Similar to the liquid crystal display apparatus 100A, according to the liquid crystal display apparatus 100E, even when the multi-domain structure is adopted and the chromaticity adjustment of W is performed, the overlapping region of an opening region 271 and the low contrast region 290 in the subpixel 120G becomes small, so that it is possible to prevent a decrease in an effective contrast value and display quality caused by formation of the low contrast regions 290.

In addition, the liquid crystal display apparatus 100E takes a measure for preventing a decrease in the effective contrast value in the subpixel 120R, too, in addition to the subpixel 120G. Hence, the effect of preventing a decrease in an effective contrast value and display quality in the liquid crystal display apparatus 100E is greater than that of the liquid crystal display apparatus 100A.

6 Modification

The driving mode of liquid crystal display apparatus 100A, 100B, 100C, 100D and 100E is the FFS mode. When the driving mode is the FFS mode, one of the pixel electrodes 196 and the common electrode 198 is the planar electrode, and the other one of the pixel electrodes 196 and the common electrode 198 is the electrode including a plurality of slit-like opening 230. When the driving mode is the FFS mode, the light shielding layer 251 is disposed overlapping the bent portion 280 which changes the extension direction of each slit-like opening 230 which is the linear portion in the plan view, so that it is possible to obtain the effect of preventing a decrease in an effective contrast ratio.

On the other hand, when the driving mode is changed to the IPS mode, the pixel electrodes 196 and the common electrode 198 are the comb electrodes, and the pixel electrodes 196 and the common electrode 198 do not overlap in the plan view. When the driving mode is the IPS mode, the light shielding layer 251 is disposed overlapping the bent portion 280 which changes the extension direction of each electrode finger of the comb electrode which is the linear portion in the plan view, so that it is possible to obtain the effect of preventing a decrease in an effective contrast ratio.

In the liquid crystal display apparatus 100A, 100B, 100C, 100D and 100E, the bent portion 280 is formed at the center portion in the second direction DY of each subpixel 120 at which the boundary line 245 is located, and the light shielding layer 251 is disposed overlapping the bent portion 280 formed on the subpixel 120G in the plan view. When the bent portion 280 is formed at the center portion, formation of the low contrast region 290 is clearly viewed. Consequently, the effect of preventing a decrease in an effective contrast value and display quality caused by disposing the light shielding layer 251 overlapping the bent portion 280 is obviously exhibited.

However, the bent portion 280 may be formed at a portion other than the center portion of each subpixel 120. Even when the bent portion 280 is formed at the portion other than the center portion of each subpixel 120, the light shielding layer 251 is disposed overlapping the bent portion 280 in the plan view. Even when the bent portion 280 is formed at the portion other than the center portion of each subpixel 120, the low contrast region 290 is formed near the bent portion 280 similar to the case where the bent portion 280 is formed at the center portion of each subpixel 120. Consequently, the effect of preventing a decrease in an effective contrast value and display quality is exhibited.

In addition, the present invention enables flexible combinations of each preferred embodiment, and appropriate modification and omission of the embodiments within the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display apparatus comprising:
an array substrate;
a liquid crystal layer; and
a color filter substrate which faces the array substrate sandwiching the liquid crystal layer therebetween, wherein
the array substrate includes
  a first electrode which is one of a pixel electrode and a common electrode, the first electrode being provided to each subpixel of a plurality of subpixels aligned in a matrix pattern in a first direction and a second direction vertical to the first direction,
  a second electrode which is other one of the pixel electrode and the common electrode, is disposed between the first electrode and the liquid crystal layer, and includes a linear portion which is formed on each of the subpixels and comprises plural slit-like openings or plural electrode fingers of a comb electrode, the linear portion including a bent portion which extends across at least two of the slit-like openings or two of the electrode fingers in the first direction and changes an extension direction of the linear portion,
  a switching element which is provided to each of the subpixels, switches a source signal according to a gate signal and supplies the switched source signal to the pixel electrode,
  a gate wire which transmits the gate signal to two or more of the switching elements respectively provided to two or more of the subpixels included in the plurality of subpixels and aligned in the first direction, and
  a source wire which transmits the source signal to two or more of the switching elements respectively provided to two or more of the subpixels included in the plurality of subpixels and aligned in the second direction,
the color filter substrate includes a color filter layer provided to each of the subpixels,
at least one substrate selected from the array substrate and the color filter substrate includes at least one light shielding layer which includes a portion that overlaps the gate wire, a portion that overlaps the source wire and a portion that overlaps the bent portion formed on a first subpixel included in the plurality of subpixels in a plan view, and makes an aperture ratio of the first subpixel lower than an aperture ratio of a second subpixel included in the plurality of subpixels and belonging to a pixel identical to a pixel to which the first subpixel belongs, and
the portion of the at least one light shielding layer that overlaps the bent portion protrudes from the portion that overlaps the source wire to overlap at least the two slit-like openings or the two electrode fingers without overlapping linear portions of the two slit-like openings or the two electrode fingers adjacent to the bent portion.

2. The liquid crystal display apparatus according to claim 1, wherein the at least one light shielding layer does not overlap the bent portion formed on the second subpixel in the plan view.

3. The liquid crystal display apparatus according to claim 1, wherein
each of the subpixels includes a first region and a second region which are divided by a boundary line in the plan view, and
the linear portion is disposed across the first region and the second region, continues from the first region to the second region, extends in a first extension direction in the first region, and extends in a second extension direction which is different from the first extension direction in the second region and forms linear symmetry with the first extension direction with respect to the boundary line, in the plan view.

4. The liquid crystal display apparatus according to claim 1, wherein
each of the subpixels includes a first region and a second region which are divided by a boundary line in the plan view, and
the linear portion includes
  a first portion which is disposed in the first region and extends in a first extension direction, in the plan view, and
  a second portion which is disposed in the second region, extends in a second extension direction which is different from the first extension direction and forms linear symmetry with the first extension direction with respect to the boundary line, and is divided from the first portion, in the plan view.

5. The liquid crystal display apparatus according to claim 1, wherein
the linear portion includes an end portion which is apart from the bent portion, and
the at least one light shielding layer overlaps the end portion in the plan view.

6. The liquid crystal display apparatus according to claim 1, wherein a luminosity factor of a color of the first subpixel is higher than a luminosity factor of a color of the second subpixel.

7. The liquid crystal display apparatus according to claim 1, wherein
the plurality of subpixels includes a red subpixel, a green subpixel and a blue subpixel, and
the first subpixel is the green subpixel.

8. The liquid crystal display apparatus according to claim 1, wherein
the at least one light shielding layer overlaps the bent portion formed on a third subpixel included in the plurality of subpixels and belonging to a pixel identical to the pixel to which the first subpixel belongs, and makes an aperture ratio of the third subpixel lower than an aperture ratio of the second subpixel and higher than an aperture ratio of the first subpixel.

9. A liquid crystal display apparatus comprising:
an array substrate;
a liquid crystal layer; and
a color filter substrate which faces the array substrate sandwiching the liquid crystal layer therebetween, wherein
the array substrate includes
a first electrode which is one of a pixel electrode and a common electrode, the first electrode being provided to each subpixel of a plurality of subpixels aligned in a matrix pattern in a first direction and a second direction vertical to the first direction, a second electrode which is other one of the pixel electrode and the common electrode, is disposed between the first electrode and the liquid crystal layer, and includes a linear portion which is formed on each of the subpixels and comprises plural slit-like openings or plural electrode fingers of a comb electrode, the linear portion including a bent portion which extends across at least two of the slit-like openings or two of the electrode fingers in the first direction and changes an extension direction of the linear portion, a switching element which is provided to each of the subpixels, switches a source signal according to a gate signal and supplies the switched source signal to the pixel electrode, a gate wire which transmits the gate signal to two or more of the switching elements respectively provided to two or more of the subpixels included in the plurality of subpixels and aligned in the first direction, and a source wire which transmits the source signal to two or more of the switching elements respectively provided to two or more of the subpixels included in the plurality of subpixels and aligned in the second direction, the color filter substrate includes a color filter layer provided to each of the subpixels, and at least one substrate selected from the array substrate and the color filter substrate includes at least one light shielding layer which overlaps the gate wire, the source wire, and the entire bent portion formed on a first subpixel included in the plurality of subpixels in a plan view, and makes an aperture ratio of the first subpixel lower than an aperture ratio of a second subpixel included in the plurality of subpixels and belonging to a pixel identical to a pixel to which the first subpixel belongs, the at least one substrate is the array substrate and the color filter substrate, and the at least one light shielding layer includes a first light shielding layer which is provided on the color filter substrate and overlaps the gate wire and the source wire in the plan view, and a second light shielding layer which is provided on the array substrate, and overlaps the bent portion formed on the first subpixel in the plan view.

10. A liquid crystal display apparatus comprising:
an array substrate;
a liquid crystal layer; and
a color filter substrate which faces the array substrate sandwiching the liquid crystal layer therebetween, wherein the array substrate includes a first electrode which is one of a pixel electrode and a common electrode, the first electrode being provided to each subpixel of a plurality of subpixels aligned in a matrix pattern in a first direction and a second direction vertical to the first direction, a second electrode which is other one of the pixel electrode and the common electrode, is disposed between the first electrode and the liquid crystal layer, and includes a linear portion which is formed on each of the subpixels and is a slit-like opening or an electrode finger of a comb electrode, the linear portion including a bent portion which changes an extension direction of the linear portion, a switching element which is provided to each of the subpixels, switches a source signal according to a gate signal and supplies the switched source signal to the pixel electrode, a gate wire which transmits the gate signal to two or more of the switching elements respectively provided to two or more of the subpixels included in the plurality of subpixels and aligned in the first direction, and a source wire which transmits the source signal to two or more of the switching elements respectively provided to two or more of the subpixels included in the plurality of subpixels and aligned in the second direction, the color filter substrate includes a color filter layer provided to each of the subpixels, at least one substrate selected from the array substrate and the color filter substrate includes at least one light shielding layer which overlaps the gate wire, the source wire and the bent portion formed on a first subpixel included in the plurality of subpixels in a plan view, and makes an aperture ratio of the first subpixel lower than an aperture ratio of a second subpixel included in the plurality of subpixels and belonging to a pixel identical to a pixel to which the first subpixel belongs, the at least one light shielding layer overlaps the bent portion formed on a third subpixel included in the plurality of subpixels and belonging to a pixel identical to the pixel to which the first subpixel belongs, and makes an aperture ratio of the third subpixel lower than an aperture ratio of the second subpixel and higher than an aperture ratio of the first subpixel, a luminosity factor of a color of the first subpixel is higher than a luminosity factor of a color of the third subpixel, and the luminosity factor of the color of the third subpixel is higher than a luminosity factor of a color of the second subpixel.

* * * * *